United States Patent
Bonfanti et al.

(10) Patent No.: US 7,687,128 B2
(45) Date of Patent: Mar. 30, 2010

(54) FILM AND COMPOUND FILMS WITH AN EMBOSSED PATTERN, PARTICULARLY FOR PRODUCING ELECTROCHEMICAL COMPONENTS

(75) Inventors: Francesco Bonfanti, Fulenbach (CH); Heinz Futscher, Alfeld (DE); Gerold Neumann, Halstenbek (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 1007 days.

(21) Appl. No.: 10/524,592

(22) PCT Filed: Aug. 13, 2003

(86) PCT No.: PCT/EP03/08998
§ 371 (c)(1),
(2), (4) Date: Feb. 15, 2005

(87) PCT Pub. No.: WO2004/018168
PCT Pub. Date: Mar. 4, 2004

(65) Prior Publication Data
US 2005/0286209 A1 Dec. 29, 2005

(30) Foreign Application Priority Data
Aug. 16, 2002 (DE) .............................. 102 38 354
Dec. 13, 2002 (DE) .............................. 102 61 920

(51) Int. Cl.
*B65D 65/28* (2006.01)
*B32B 3/10* (2006.01)
*H01M 4/70* (2006.01)
*H01M 2/12* (2006.01)

(52) U.S. Cl. ...................... 428/43; 428/195.1; 429/209; 429/233; 429/246

(58) Field of Classification Search .................. 429/211, 429/233, 209, 246; 29/2, 623.3; 310/365–368; 428/43, 136, 137, 195.1, 571, 572
See application file for complete search history.

(56) References Cited

U.S. PATENT DOCUMENTS

| | | | | |
|---|---|---|---|---|
| 3,501,099 A | * | 3/1970 | Benson ........................ | 239/584 |
| 4,053,695 A | * | 10/1977 | Peters et al. ................. | 429/225 |
| 4,151,535 A | * | 4/1979 | Uberbacher ............. | 346/139 C |
| 4,499,566 A | * | 2/1985 | Abbott ........................ | 367/165 |
| 4,528,255 A | * | 7/1985 | Hayes et al. ................. | 429/233 |
| 4,951,967 A | * | 8/1990 | Michalik ........................ | 281/2 |
| 5,055,734 A | * | 10/1991 | Grawey et al. .............. | 310/366 |

(Continued)

*Primary Examiner*—Mark Ruthkosky
*Assistant Examiner*—Gerard T Higgins
(74) *Attorney, Agent, or Firm*—Gudrun E. Huckett

(57) ABSTRACT

A stamped film to be connected to an additional film has a stamped pattern defining at least one dividing line that is interrupted in a regular pattern by webs, wherein the webs each have a width that is, on average, less than an average spacing between two adjacently positioned ones of the webs, respectively. The stamped pattern has, at least in one direction, several dividing lines extending parallel to one another or has several dividing lines extending perpendicularly to one another. When mirroring the stamped film at a mirror plane that intersects the stamped film centrally and perpendicularly to the dividing lines, the webs of the dividing lines will not be superimposed on webs of a stamped film that has not been mirrored when superimposing the mirrored stamped film on the stamped film that has not been mirrored. The stacked films form electrochemical or electrochromic compounds.

8 Claims, 1 Drawing Sheet

U.S. PATENT DOCUMENTS

| | | | |
|---|---|---|---|
| 5,125,927 A * | 6/1992 | Belanger | 606/45 |
| 5,155,409 A * | 10/1992 | Swanson et al. | 310/366 |
| 5,524,930 A * | 6/1996 | Foster et al. | 281/21.1 |
| 5,537,905 A | 7/1996 | Zimmer et al. | 83/660 |
| 5,836,226 A | 11/1998 | Tsuji et al. | 83/129 |
| 6,030,421 A | 2/2000 | Gauthier et al. | 29/623.1 |
| 6,132,477 A | 10/2000 | Warren | 29/623.1 |
| 6,197,449 B1 * | 3/2001 | Hoffmann et al. | 429/233 |
| 6,348,283 B1 * | 2/2002 | Mas et al. | 429/161 |
| 6,402,328 B1 * | 6/2002 | Bechtel et al. | 359/603 |
| 6,444,366 B1 | 9/2002 | Kawano et al. | 429/241 |
| 6,740,351 B2 | 5/2004 | Schoch et al. | 427/79 |
| 6,886,439 B2 * | 5/2005 | Marlow et al. | 83/171 |
| 6,949,313 B2 * | 9/2005 | LaFollette | 429/228 |
| 2002/0053860 A1 * | 5/2002 | Mitarai et al. | 310/366 |

* cited by examiner

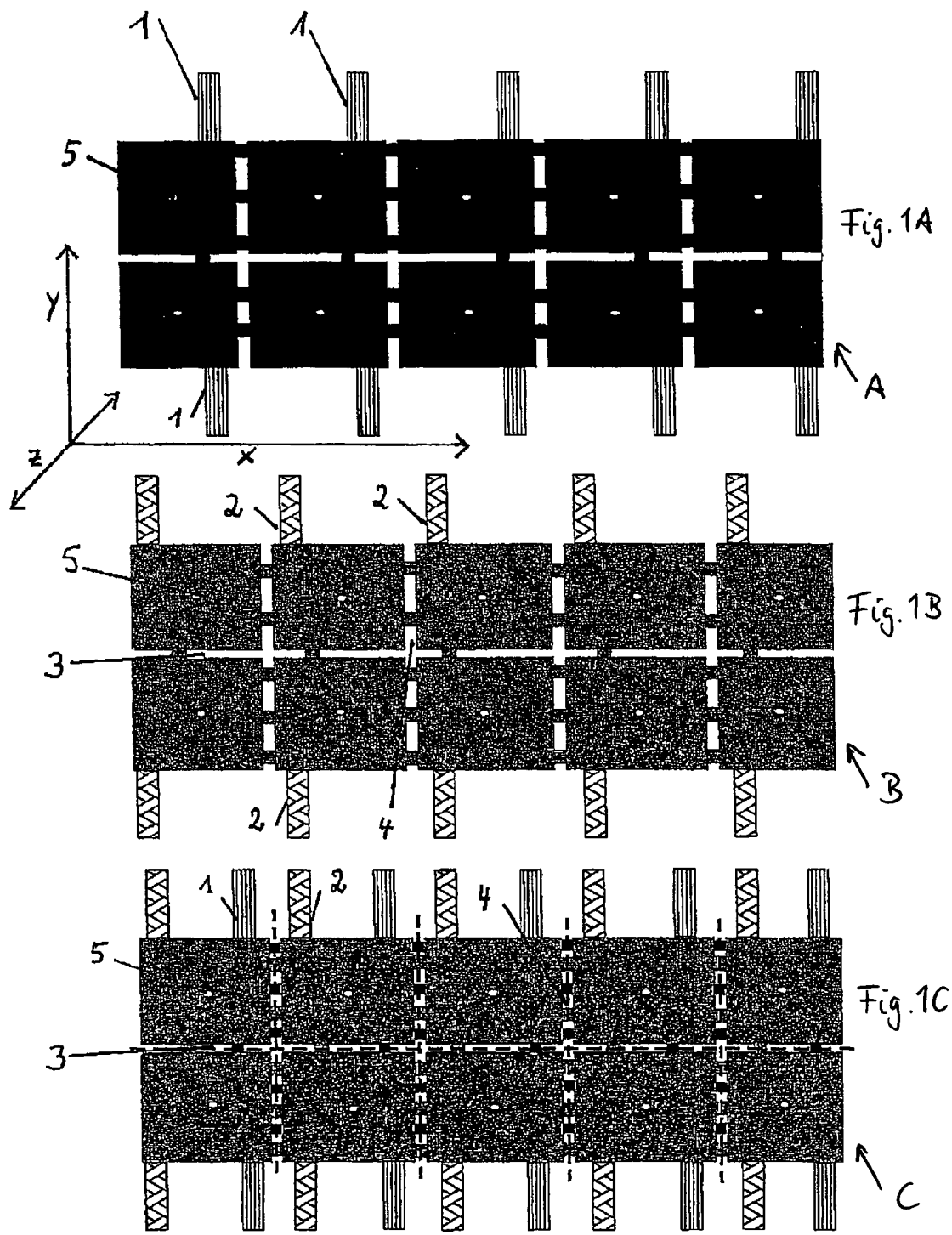

FILM AND COMPOUND FILMS WITH AN EMBOSSED PATTERN, PARTICULARLY FOR PRODUCING ELECTROCHEMICAL COMPONENTS

BACKGROUND OF THE INVENTION

The present invention relates to a spatial configuration of films with electrochemical properties, wherein the films can be used for producing layer compounds for use as batteries, electrochromic compounds or the like.

Since the beginning of the '70s, it has been attempted to produce electrochemical components such as batteries or the like in the form of thin films. The object is to obtain components that, on the one hand, are so flexible that they can be, for example, rolled up or matched to another desired shape and, on the other hand, can provide particularly beneficial charging and discharging properties by means of extremely large contact surfaces between the individual electrochemical parts, such as electrodes or electrolytes, relative to the employed volume of electrochemically active material.

The film technology fulfills the aforementioned requirements in an excellent way. Therefore, electrode materials or electrolyte materials in film form, for example, for batteries, are produced as fabricated material that are subsequently combined to a film compound with the desired electrochemical properties by lamination under suitable pressure action or temperature action. Examples for the manufacture of such films are known in many embodiments in the patent literature or in the relevant technical literature and are known to a person skilled in the art.

The manufacture of electrochemical components by means of (endless) films provides great economical advantages because film processing at high speed can be performed. In this connection, an advancing speed of several meters per minute is possible. However, for such a manufacture several boundary conditions must be observed that require a high technical expenditure. This is based in particular on the fact that, for obtaining a high throughput, the different films must be processed as long as possible from roll to roll or in the form of large sheets in order to reduce the number of manipulation steps. If it is desired to separate the complete stacked/laminated film compounds after their processing, it is necessary to perform stamping actions through the complete film compound. However, this results in significant problems because the separation by cutting tools generates edges of cut through the complete film compound. In this connection, the cutting tool can cause smearing of materials from different films across the edges of cut; this has negative effects with regard to the functionality of the electrochemical components. Separation of the different films already before lamination however requires a precise arrangement of the film elements relative to one another before they are laminated or connected in other ways. However, this can be realized only with great difficulty in particular for a high manufacturing throughput.

SUMMARY OF THE INVENTION

The present invention relates to a spatial configuration of films with electrochemical properties, wherein the films can be used for producing layer compounds for use as batteries, electrochromic compounds or the like.

This object is solved by providing films with a specific stamped pattern similar to a perforation; the stamped pattern predetermines the edges of cut for the future separation—by cutting or another method—of compounds from such films that are laminated to one another or joined otherwise. In this connection, the stamping defines at least one, generally several, stamped spacings as dividing lines that can be arranged, for example, at a right angle to one another and are interrupted by webs in a regular pattern. These webs have a width that is, on average, less than the average spacing between two webs. In particular, it is preferred that the width of each web is less than the spacing of this web to the neighboring webs. Also, it is optionally preferred and in some cases necessary (for example, when three films according to the invention are provided for a compound film) that the width of the webs, on average, is not more than half the average spacing between two webs.

The films according to the invention enable, on the one hand, processing of the respective films from roll to roll or in the form of large sheets, and, on the other hand, they can be stacked on top one another such that their dividing lines for the future cutting step or the like are superimposed while the webs of these dividing lines are staggered relative to one another so that they are never superimposed. Therefore, during the subsequent separation there is nowhere an edge of cut with smearing of the components of the individual films of the film compound so that contact between the materials of the different films cannot occur.

In a preferred embodiment of the invention, the stamping defines at least in one direction (y) dividing lines that extend parallel to one another and are arranged such on the film sheet or film leaf (positioned in the x-y plane) or the film roll that the webs, when mirrored at the center of the film perpendicularly to these dividing lines (i.e., mirrored at a centrally arranged plane in the x-z direction), will not be superimposed on the webs of the film that is not mirrored. When two such films are laminated with one another with one film being positioned mirror-inverted relative to the so-called x-z plane relative to the other film, the webs of the dividing lines in the y direction cannot overlap, which is desired.

In a preferred second embodiment, the stamping defines dividing lines that extend perpendicularly to one another. The webs of one or several dividing lines, which dividing lines extend in a first direction (x), are arranged such that, when the webs are mirrored at a mirror plane (y-z) that intersects the film centrally and at a right angle to said first direction, the webs will not be superimposed on the webs of the film that has not been mirrored. When two such films are laminated to one another while the head (viewed in the x direction) of one film is positioned above the foot (viewed in the same direction) of the other film, the webs of the dividing lines in the x direction cannot overlap, which is desired.

It is particularly preferred to combine the features of the two above described embodiments with one another, in particular, in such a way that a stamping pattern with at least one dividing line in the x direction and several dividing lines in the y direction is produced whose webs—those of the dividing line(s) in the x direction as well as those of the dividing lines in the y direction—upon rotation about a central axis z that extends perpendicularly to the film plane (x-y) will not be superimposed. In this configuration, both films of a future laminate can be provided with precisely the same stamping pattern, i.e., can be produced with the same machines without having to change their adjustments, and can be arranged for forming the film compound such on top one another that the first film is superimposed on the second film by being turned over and rotated by 180°. In this spatial position relative to one another, the webs of the two films cannot overlap.

Alternatively, it can also be expedient to generate the stamping pattern with other patterns such that the stamping pattern of the first film to be laminated cannot be brought into a congruent arrangement with the second film to be laminated. Such asymmetries can help to reduce the risk of possibly erroneous stacked arrangement when stacking the films on top one another.

When the films according to the invention are provided as a cathode film or anode film, they are generally already laminated with preferably a net-like discharge film whose current dischargers project past the lateral edges of the film. Film compounds with such films will be separated only in such a way that in the (shorter) transverse direction not more than two components, whose dischargers project laterally from the film, are provided adjacent to one another on the basic surface of the film compound. In other words, such films will have no, or at most one, dividing line on the (longer) x axis. When in these configurations having a central dividing line the current dischargers are kept sufficiently narrow and are arranged asymmetrical to one another relative to the side from which they project, but are arranged symmetrical to one another relative to the left and to the right, the films as described in connection with the second preferred embodiment as well as in connection with the embodiment described as being especially preferred can be superimposed without there being the possibility that the current dischargers of cathode and anode could contact one another.

In order to simplify the exact positioning of the individual films relative to one another during stacking it can be advantageous to provide holes for positioning pins simultaneously with the film stamping step for producing the future cutting lines. Such positioning openings can be provided in the center of each element but also at other locations of the film, for example, in the webs of the stamped dividing line.

The manufacture of the stamped films is realized in stamping tools as they are known in the prior art. Preferred is a method in which a holding-down device presses the film to be stamped fixedly against a support. Subsequently, a hollow-ground blade is moved downwardly through a slot in the holding-down device. This blade carries out the cut and forces the material that has been separated in the downward direction so that it is removed from the web area.

BRIEF DESCRIPTION OF THE DRAWING

In FIGS. 1A to 1C, an example of a film according to the invention is illustrated, wherein FIG. 1A illustrates a first stamped film. FIG. 1B a second stamped film, and FIG. 1C the two films when superimposed.

DESCRIPTION OF PREFERRED EMBODIMENTS

These films, for example, are suitable for manufacturing film-based batteries that are comprised of three films: the anode A, the cathode B, and the separator. The separator separates anode and cathode electronically and can therefore be placed without being pre-stamped between the two electrode films. The correlated current dischargers 1, 2 project from the electrode films, respectively; they are indicated by cross-hatching. When the stamped film (cathode) B is placed onto the stamped film (anode) A, the arrangement C as shown in Fig.1C results. As a separation means between the anode A and the cathode B the separator is introduced. The separator must not be pre-stamped and is therefore not illustrated in the drawings of FIGS. 1A-1C. Along the dividing lines 3 in the x direction and 4 in the y direction, illustrated in dashed lines, individual elements can be separated from the film compound C by a cutting tool in such a way that the cutting blade does not cut at any location through all films at the same time but cuts only through the webs, respectively, of the individual films that are staggered relative to one another. The stamping of the films illustrated in FIGS. 1A-1C is a concrete example for the above embodiment that has been mentioned as particularly preferred in which the stamping pattern of the films A and B is symmetrical in such a way that both films can be pre-stamped by the same stamping tool and the pattern of the film B is transferred by a simple rotational mirroring into the pattern of the film A.

In FIG. 1, additional openings for positioning pins are provided which are referenced by reference numeral 5. The position of the positioning openings in this embodiment is at the center of each field that predetermines the dimensions of the future component.

What is claimed is:

1. A stacked film arrangement comprising:
at least one stamped anode film and at least one stamped cathode film, wherein the stamped anode and cathode films, each have a stamped perforation pattern defining at least one dividing line and predetermining the edges of cut for future separation into individual elements, wherein said at least one dividing line is interrupted in a regular pattern by webs, wherein the webs each have a width that is, on average, less than an average spacing between two adjacently positioned ones of the webs, respectively, wherein the stamped anode and cathode films are stacked on top one another with interposition of a separator film that electronically separates the stamped anode and cathode films and are superimposed in a staggered arrangement relative to one another such that the webs of the at least one stamped anode film and the webs of the at least one stamped cathode film are not superimposed, the stacked film arrangement forming a compound film.

2. The stacked film arrangement according to claim 1, wherein the stamped perforation patterns of the stamped anode and cathode films are identical and wherein a first one of the stamped anode film and cathode films is arranged relative to a second one of the stamped anode and cathode films in a rotated position rotated by 180° about a surface axis of the first one of the stamped anode and cathode films.

3. The stacked film arrangement according to claim 1 configured to produce electrochemical or electrochromic components.

4. The stacked film arrangement according to claim 1, wherein the stamped perforation patterns of the stamped anode and cathode films each have, in a first direction, several dividing lines that extend parallel to one another, wherein in the stacked film arrangement a first one of the stamped anode and cathode films is arranged in a mirrored position, mirrored at a mirror plane intersecting said first one of stamped anode and cathode films centrally and perpendicularly to said several dividing lines, respectively, and the webs of said several dividing lines in the mirrored position are not superimposed on webs of a second one of stamped anode and cathode films that has not been mirrored 5. The stacked film arrangement according to claim 1, wherein the stamped perforation pattern of the stamped anode and cathode films each have several dividing lines that extend perpendicularly to one another in a first direction and in a second direction, wherein a first one of the stamped anode and cathode films is arranged in a mirrored position, mirrored at a mirror plane, which mirror plane intersects said first one of the stamped anode and cathode films centrally and perpendicularly to said first direction, and the webs of said several dividing lines that extend in said first direction are not superimposed in the mirrored position on webs of a second one of the stamped anode and cathode films that has not been mirrored.

6. The stacked film arrangement according to claim 1, wherein the stamped perforation patterns of the stamped anode and cathode films each have the webs arranged such that a first one of the stamped anode and cathode films is arranged in a rotated position, rotated by 180° about a central axis of rotation that is positioned perpendicularly to a surface plane of said first one of the stamped anode and cathode films, and the webs of said first one of the stamped anode and cathode films in the rotated position are not superimposed on the webs of a second one of the stamped anode and cathode films that has not been rotated.

7. The stacked film arrangement according to claim 1, wherein the stamped anode and cathode films are joined to one another.

8. The stacked film arrangement according to claim 1, wherein the stamped anode and cathode films are laminated to one another.

* * * * *